United States Patent Office 2,985,655
Patented May 23, 1961

2,985,655

PREPARATION OF N-CHLORINATED ISOCYANURIC ACIDS

Murray Garber, Norwalk, Conn., assignor to American Cyanamid Company, New York, N.Y., a corporation of Maine No Drawing. Filed Oct. 31, 1957, Ser. No. 693,538

3 Claims. (Cl. 260—248)

The present invention is concerned with a novel method for the preparation of N-halogeno triazines, particularly N-chloro isocyanuric acids. These compounds because of their readily-available chlorine content, are well suited for the preparation of dry bleaching compositions and the like. Commercially, an increasing interest is being shown in their production and use.

Unfortunately, no wholly satisfactory process for their production on a commercial basis has been available. In the past, for example, trichloro isocyanuric acid has been prepared by dissolving cyanuric acid in a dilute aqueous solution of caustic soda to form the sodium salt and passing elemental chlorine into resulting solution. Product is formed as a precipitate. When chlorination ceases, the reaction mixture is filtered or centrifuged, the solids being collected, washed and dried, the filtrate being recycled.

While this method is simple and straightforward, unfortunately, it is not well-suited for the production of N-chloro isocyanuric acids on a commercial scale. The process, to be made an economic one, requires the recycle of large amounts of mother liquor. Moreover, for each mol of cyanuric acid fed, there also is formed some nine to thirteen or more grams of nitrogen trichloride. The highly unstable nature of this by-product makes the procedure for collecting, washing and drying operation extremely hazardous.

There remains, then, a need for a process which is not subject to these limitations. Such a procedure should be one which is capable of operation in available equipment, with a minimum of supervision, and with a minimum formation of by-product nitrogen trichloride, preferably one gm. or less per mol of cyanuric acid fed. It is, therefore, the principal object of the present invention to provide such a process.

These objects have been accomplished in a highly satisfactory manner in an improved process which may be simply described. Cyanuric acid is slurried in water which contains a sufficient amount of a suitable acidic constituent to produce an initial pH less than 7 but above about 2.5. Elemental chlorine is then passed into the slurry while the latter is agitated sufficiently to maintain good dispersion of the incoming chlorine the reaction mixture being maintained below about 20° C. Cyanuric acid is thereby converted to insoluble N-chlorinated isocyanuric acid. When reaction is completed, the product is collected, washed and dried in any desired manner. When thus carried out, the reaction produces the desired product in excellent yield with an astonishingly small by-product nitrogen trichloride formation. A two to three thousand percent reduction in the amount of the latter produced is readily obtained.

Not only does this novel method enable the production of trichloro isocyanuric acid in a safe manner, but it also enables the production of monochloro- and dichloroproducts as may be desired. This is readily accomplished by controlling the initial pH of the slurry. If reaction is started at a pH below four but above 2.5, preferably about three, and elemental chlorine is passed into the suspension until chlorination ceases at a pH of from about 2.5 to about 1.5, the product will be predominately monochloro isocyanuric acid. If chlorination is carried out from an initial pH of from five to about four, the product is predominantly dichlorinated. Starting at a pH above about five, but less than seven a product which is predominantly trichlorinated is obtained.

It is an advantage of the process of the present invention that no unusual equipment or precautions are required. It is necessary, however, to the usual precautions for handling elemental chlorine, for example, as to the use of corrosion resistant apparatus, and the provision of the usual venting in handling gases of this nature. Reaction is exothermic and provision should be made for preventing an excessive temperature rise. Good results are obtained at from about 0° C. up to about 20° C. with about 1°–5° C. being preferable.

The invention will be more fully illustrated in conjunction with the following examples, which are intended as illustrative only. Except as otherwise noted, parts are by weight on a parts/liter of water basis.

Example 1

In about a liter of water, about 0.4 mol of cyanuric acid is suspended with active agitation. Resultant slurry has a pH of about three. Molecular chlorine is then pumped into the agitated slurry, the temperature being controlled at from about 0° to about 20° C. Chlorine addition is continued until the pH is about 1.5. Resulting product is collected by filtration, air dried and assayed for available chlorine. Its chlorine content of about 41 percent indicated about 94.4% of theoretical for monochloroisocyanuric acid.

Example 2

A solution is prepared by dissolving about 0.88 mol of monosodium phosphate per liter in water and adding thereto sufficient additional salt to produce a pH of about four. Thereto is added about 0.4 mol per liter cyanuric acid, the mixture being stirred and cooled to about 0° C. Molecular chlorine is passed into the stirred slurry at below 5° C. until the pH is approximately 1.5. Reaction is stopped, product is collected by filtration, washed with a small amount of cold water and air dried. Its available chlorine content is about 67%, indicating about a 93.5% of theoretical content for dichloroisocyanuric acid. A surprisingly small amount of nitrogen trichloride of some 0.25 gram per mol of cyanuric acid charged is obtained.

Example 3

A solution is prepared by dissolving about 1.24 mols of sodium acetate per liter of water and adjusting the pH to about 6.5 with dilute acetic acid. Therein is slurried about 0.4 mols per liter of cyanuric acid. While maintaining the stirred slurry at about 0°–5° C., molecular chlorine is added to the agitated slurry until the pH reaches about two. Resultant product, is collected by filtration, is washed with cold water, air dried and assayed for available chlorine. The latter indicates approximately 91% or 99% of theory for trichloroisocyanuric acid. Only about 0.27 gm. of nitrogen trichloride per mol of cyanuric acid charged is obtained.

Within the indicated limits, substantially no difficulty is encountered in carrying out the process of the present invention. Reducing salts should be avoided but any of a wide variety of readily-available acid salts can be used to produce the desired initial pH. In addition to those indicated above, various disodium phosphates and sodium silicates and mixtures thereof may be used. Where the available acid salts, or a combination of them, does not produce the desired initial pH, the latter may be further adjusted by the addition of a small amount of a dilute aqueous acid solution. For this purpose, hydrochloric, sulfuric or phosphoric acids, among others, may be used.

I claim:
1. A method of producing trichloroisocyanuric acid which comprises: forming a slurry of cyanuric acid in water containing a sufficient amount of a soluble material having an acidic reaction to produce a pH above 5 but below 7; adding to said slurry at a temperature of from between about 0° C. to about 20° C. elemental chlorine in an amount sufficient to produce a pH between about 1.5 and about 2.5; stopping the chlorine addition and, thereafter, collecting resultant precipitate of trichloroisocyanuric acid substantially free from nitrogen trichloride.

2. A process according to claim 1 which comprises: adding the clorine to a slurry having a pH of about 6.5, said chlorine being introduced into said slurry at a temperature of from about 0° C. to 5° C.

3. A method for producing trichloroisocyanuric acid which comprises: dissolving sodium acetate in an aqueous medium; adjusting the pH of said sodium acetate to that of about 6.5 by adding thereto dilute acetic acid; slurrying cyanuric acid by adding the latter to the so-acidified aqueous medium while maintaining the pH of the mixture at about 6.5; stirring the mixture at a temperature of from 0° C. to 5° C.; introducing chlorine in amounts sufficient to lower the pH to between 1.5 and 2.5; stopping the chlorine addition; and thereafter collecting the resultant trichloroisocyanuric precipitate in good yield substantially free from nitrogen trichloride contaminant.

References Cited in the file of this patent
UNITED STATES PATENTS

| | | |
|---|---|---|
| 2,171,901 | Wilson et al. | Sept. 5, 1939 |
| 2,184,886 | Muskat et al. | Dec. 26, 1939 |
| 2,472,361 | Arsem | June 7, 1949 |
| 2,828,308 | Lorenz | Mar. 25, 1958 |
| 2,897,154 | Low | July 28, 1959 |
| 2,913,460 | Brown et al. | Nov. 17, 1959 |

OTHER REFERENCES

Rice et al.: J. Amer. Chem. Soc., vol. 47 (1925).
Klotz et al.: J. Amer. Chem. Soc., vol. 63 (1947), pages 801–3.